March 8, 1932.  M. M. McDONALD  1,848,186
CHEESE CUTTER
Filed April 17, 1930  2 Sheets-Sheet 1
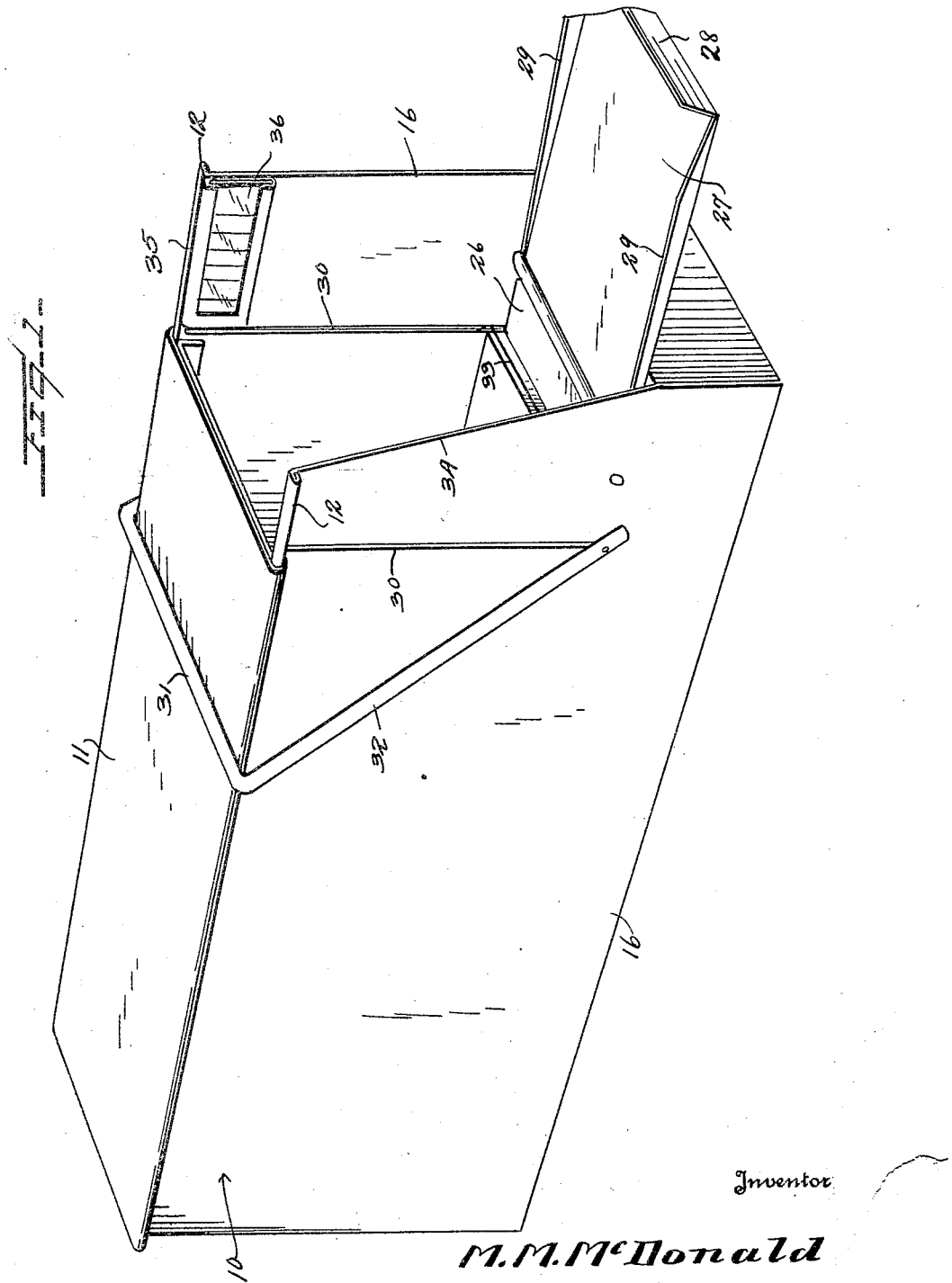
Inventor
M. M. McDonald
By Watson E. Coleman
Attorney March 8, 1932.  M. M. McDONALD  1,848,186
CHEESE CUTTER
Filed April 17, 1930   2 Sheets-Sheet 2
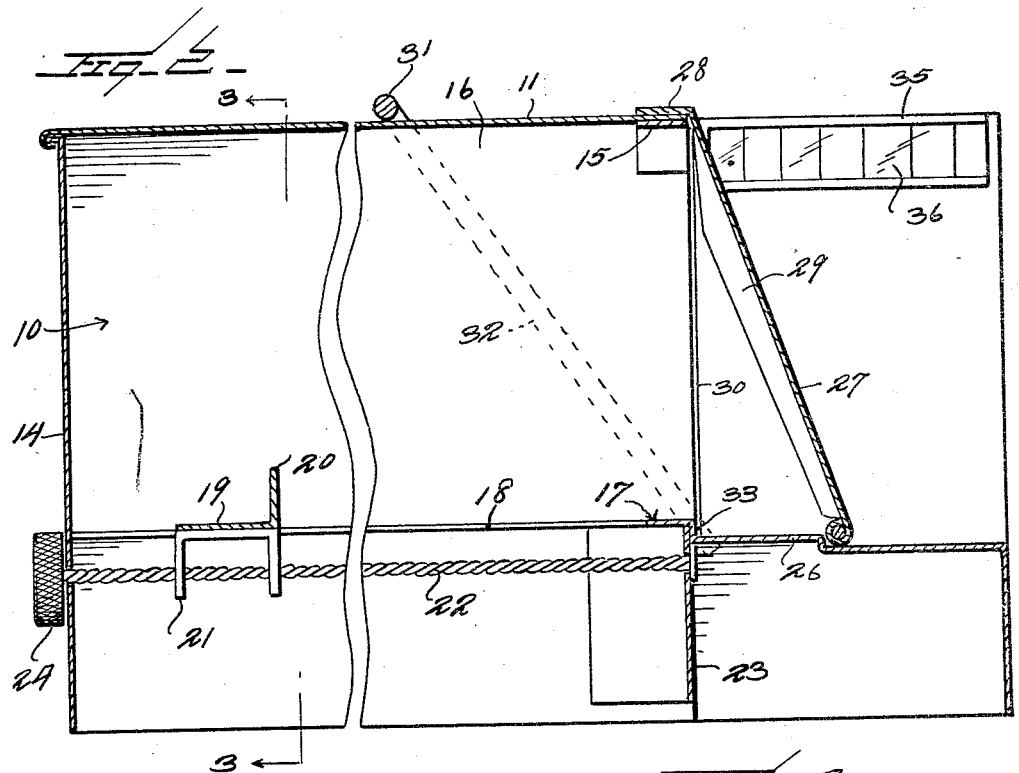
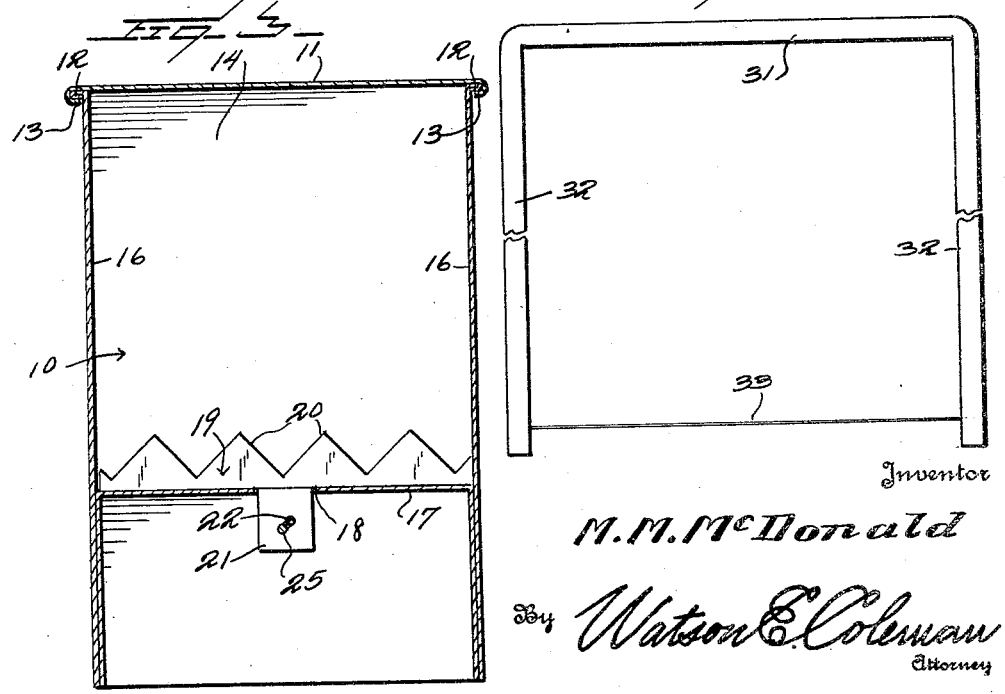
Inventor
M. M. McDonald
By Watson E. Coleman
Attorney Patented Mar. 8, 1932

1,848,186

UNITED STATES PATENT OFFICE

MAX M. McDONALD, OF KNOXVILLE, TENNESSEE

CHEESE CUTTER

Application filed April 17, 1930. Serial No. 445,050.

The present invention relates to cutting devices and more particularly to a device adapted for use in cutting cheese or the like.

An object of this invention is to provide a device by means of which cheese may be readily cut to any desired size.

Another object of this invention is to provide a receptacle or holder in which the cheese may be positioned, the holder having a movable carrier for moving the cheese therein so that it will not be necessary to touch the cheese with the hands during the cutting operation.

A further object of this invention is to provide a sanitary holder or receptacle for cheese which is so constructed that when not in use it may be readily closed and the device placed in an icebox or other cooling medium.

A still further object of this invention is to provide in combination with a cutter, a series of graduations positioned upon the inner side of the receptacle so that the cheese may be moved longitudinally within the receptacle to the proper graduations so that the cheese may be cut in one piece to the desired weight.

The above and various other objects and advantages of this invention will in part be described in and in part be understood from the following detailed description of the present preferred embodiment, the same being illustrated in the accompanying drawings wherein:

Figure 1 is a detail fragmentary perspective view of a device constructed according to the preferred embodiment of this invention;

Figure 2 is a fragmentary sectional view taken substantially through the longitudinal center of the device;

Figure 3 is a transverse sectional view taken on the line 3—3 of Figure 2, and

Figure 4 is a fragmentary detail side elevation of the cutter member.

Referring to the drawings wherein like numerals of reference designate corresponding parts throughout the several views, the numeral 10 designates generally a receptacle or holder which is provided with an open top, and a lid 11 is slidably mounted on the top of the receptacle, the lid being slidably secured to a pair of guide members 12 which are formed integrally with the top of the receptacle and outstanding therefrom. The slidable lid 11 is provided with reverted outer end portions 13 which engage the guide 12 so as to slidably hold the lid upon the container 10. One end of the container 10 is closed as at 14 and the opposite end of the container is open.

A bracing member 15 is positioned across the top of the container and at a point spaced inwardly from the open end thereof so as to hold the sides 16 in rigid position.

The container 10 is provided with a bottom 17 which is positioned within the container at a point spaced upwardly from the lower edge portion thereof, and the inner or false bottom 17 is provided with a longitudinally disposed slot 18.

A carrier 19 is positioned transversely across the container 10 and is provided at the forward end thereof with a vertically disposed toothed member 20 which is adapted to extend into the body of the cheese so as to move the cheese longitudinally within the container 10. The carrier 19 is provided with depending lugs 21 which are adapted to engage a spiral member 22 which is rotatably positioned in the container 10 being secured at one end thereof to a transverse plate 23 and the opposite end of the spiral member 22 extends outwardly of the closed end of the container 10 and is provided with an operating member 24 so that the spiral member may be rotated within the container so as to move the carrier 19 longitudinally within the container.

In actual practice the spiral member 22 is formed by twisting a pair of wires together, the wires engaging in apertures 25 in the lugs 21, the apertures 25 being so constructed as to force the carrier 19 to move longitudinally within the container when the spiral member 22 is rotated.

At the open end of the container 10 the inner bottom 17 is stepped downwardly as at 26 and a hinged closure member 27 is pivotally secured to the opposite sides 16 of the container at a point spaced inwardly from the free end of the container, the hinged closure member 27 having a flange 28 which is adapted to engage the bracing bar 15 when the closure member is in closed position.

The opposite sides of the closure member 27 are provided with upstanding flanges 29 so that when the cheese is cut in the container, the cheese will not slide off of the hinged member 27, the hinged member 27 being adapted to receive the cut portion of the cheese. The sides 16 are provided with vertically disposed slots 30 at a point spaced inwardly from the free end of the container 10 and spaced inwardly from the hinged closure member 27.

A cutter member generally designated at 31 is adapted to be slidably positioned in the slots 30, the cutter member 31 comprising a substantially U shaped frame 32 upon the free ends of which is secured a cutting wire 33, the cutting wire 33 being maintained in taut condition by the resiliency of the U shaped frame member 32. The guide members 12 extend over the top of the slots 30 so that when the cutter 31 is in position, the upward movement of the cutter 31 is limited by the guide members 12.

One end of one of the side members 16 is cut away as at 34 so that practically the entire inner face of the opposite side member may be exposed, the opposite side member being provided with a card rack 35, the card rack 35 being adapted to receive a card 36 having a plurality of graduations or configurations thereupon and if desired a price scale or the like may be incorporated with the scale member 36 so that when cheese of various sizes are cut, the price of the cut portion is readily discernible.

In the operation of this device, the lid 11 may be moved rearwardly on the guide track 12 and an elongated cheese positioned within the container or holder 10, the cheese being positioned between the opposite sides 16. The lid 11 may then be moved into closed position and it is not necessary to move the lid into opened position again until replacement of the cheese is necessary. When the cheese is placed within the container 10, the carrier 19 is moved rearwardly to the end of the slot 18 in the inner bottom 17, and the cheese is placed downwardly upon the teeth 20 of the carrier. The cheese may then be moved toward the open end of the container by rotating the spiral member 22 which will move the carrier 19 forwardly and coactively move the cheese toward the open end and past the slots 30.

The cheese may be moved to the desired graduation shown on the weight scale 36, it of course being understood that when the cheese is moved past the slots 30 the cutter 31 may be positioned in either the extreme downward or upward position thereof. The cutter member 31 may then be moved either upwardly or downwardly within the slots 30, the cutting member 33 cutting through the cheese and forming the desired slice which when cut will drop upon the hinged member 27 and may then be readily removed from the device.

It will be obvious from the foregoing that the receptacle or container 10 may be made in any desired size and configuration and that the cheese may be formed so as to readily fit within the container and the graduation or scale member 36 provided with suitable graduations so that the desired cut may be made from the body of the cheese, and when the cut has been made it will be of the desired weight. It will also be obvious that once the cheese has been placed within the container 10 it will not be necessary to handle the cheese again with the hands and that a very sanitary container or device has been disclosed.

In the preferred embodiment of this invention the container 10 is preferably made of metal which may be suitably enamelled or painted so as to make a container of pleasing appearance and one which may be readily cleansed when the cheese has been removed therefrom.

It will, of course, be understood that various changes and modifications may be made in the details of construction and design of the specifically described embodiment of the invention without departing from the spirit thereof, such changes and modifications being restricted only by the scope of the following claim.

What is claimed is:—

A cheese cutter of the character described comprising a container, a slidable lid for said container, a hinged closure member secured to one end of said container, said container having an elongated vertically disposed slot in each side thereof, a vertically movable cutter positioned in said slots, and means for limiting the upward movement of the cutter, said means being integral with said container.

In testimony whereof I hereunto affix my signature.

MAX M. McDONALD.